United States Patent [19]
Pressler et al.

[11] Patent Number: 6,005,700
[45] Date of Patent: Dec. 21, 1999

[54] COMPUTER PERIPHERAL DEVICE WITH DETACHABLE PORTION AND LIGHT DISPLAY

[75] Inventors: Stephen M. Pressler, Uniontown; Brian W. Casto, Navarre, both of Ohio

[73] Assignee: Aironet Wireless Communications, Inc., Fairlawn, Ohio

[21] Appl. No.: 08/670,610

[22] Filed: Jun. 26, 1996

[51] Int. Cl.⁶ ................................................. H04B 10/00
[52] U.S. Cl. ........................... 359/172; 235/492; 362/32; 385/88; 385/89; 395/282; 395/500; 340/687
[58] Field of Search ........................... 359/172; 362/500, 362/282; 385/88, 89, 49; 235/492; 395/500, 282; 340/687

[56] References Cited

U.S. PATENT DOCUMENTS

| | | | |
|---|---|---|---|
| 4,383,729 | 5/1983 | Suzuki et al. | 385/89 |
| 4,820,010 | 4/1989 | Scifres et al. | 385/88 |
| 5,259,054 | 11/1993 | Benzoni et al. | 385/89 |
| 5,345,367 | 9/1994 | Pierce et al. | 362/32 |
| 5,373,149 | 12/1994 | Rasmussen | 235/492 |
| 5,613,092 | 3/1997 | Lim et al. | 395/500 |
| 5,631,988 | 5/1997 | Swirhun et al. | 385/89 |
| 5,664,862 | 9/1997 | Redmond et al. | 362/32 |
| 5,708,833 | 1/1998 | Kinney et al. | 395/282 |
| 5,764,845 | 6/1998 | Nagatani et al. | 385/88 |

FOREIGN PATENT DOCUMENTS

| | | |
|---|---|---|
| 2928668A | 2/1981 | Germany . |
| 9421058 | 9/1994 | WIPO . |

*Primary Examiner*—Daniel J. Wu
*Assistant Examiner*—John Tweel, Jr.
*Attorney, Agent, or Firm*—Arter & Hadden LLP

[57] ABSTRACT

A peripheral device for a computer, including a first portion including electronic circuitry and a light source for emitting light; a second portion selectively detachable from the first portion, the second portion including a light transfer medium for directing light from one end of the light transfer medium to another end; and wherein the one end of the light transfer medium is optically aligned with the light source when the second portion is attached to the first portion, and the light transfer medium directs at least a fraction of the light emitted from the light source from the one end to the another end for display from the second portion.

20 Claims, 5 Drawing Sheets

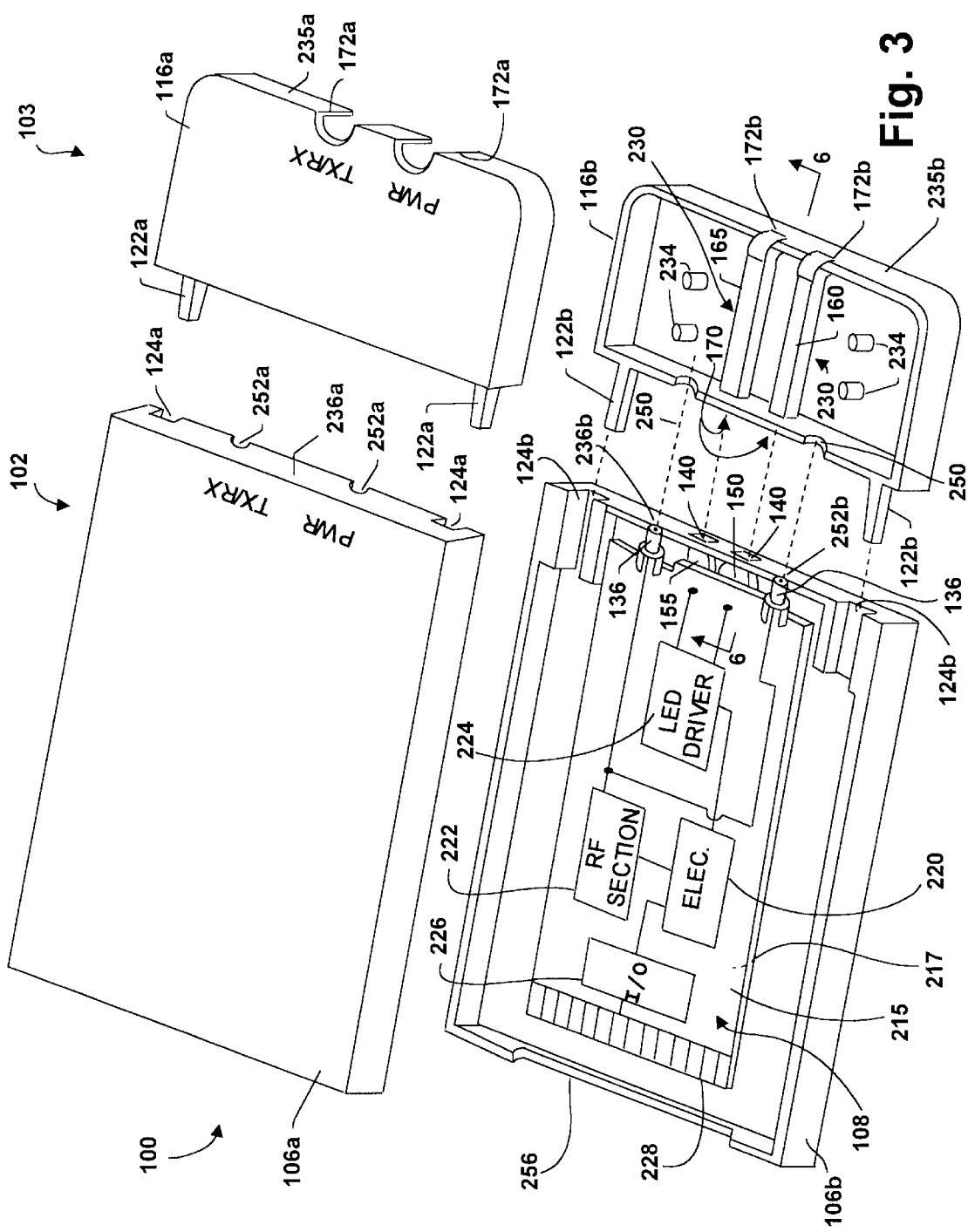

COMPUTER PERIPHERAL DEVICE WITH DETACHABLE PORTION AND LIGHT DISPLAY

TECHNICAL FIELD

The present invention relates generally to computer peripheral devices having a detachable portion, and more particularly to a peripheral device having a detachable portion with a light display.

BACKGROUND OF THE INVENTION

Computers have become increasingly popular over the years for both business and personal applications. In conjunction with the development of computers has been the related development of peripheral devices designed to increase the functionality of the computers. As an example, Personal Computer Memory Card International Association (hereinafter "PCMCIA") cards are commonly used with portable and desktop computers to provide added features and/or functions. For instance, PCMCIA cards are often configured to function as a math co-processor, a sound card, a modem, etc.

Recent developments have resulted in PCMCIA cards which provide a wireless link between a computer and a network. The wireless connection requires the PCMCIA card to have an antenna. To accommodate this need, some PCMCIA cards have a slot where an external antenna can be connected while other PCMCIA cards have an antenna built in. Moreover, it is also known to have a PCMCIA card with a detachable antenna to allow further flexibility. When the antenna is detached, the PCMCIA card still provides a place for connecting an external antenna thereby allowing versatility in use.

In order to provide a user with operational information related to the PCMCIA card, light emitting diodes (LEDs) are typically mounted at the end of the PCMCIA card consisting of the detachable antenna. This end generally protrudes from the computer when the PCMCIA card is inserted therein to allow the antenna unobstructed access to the airwaves. The LEDs provide a display which indicates to a user information such as whether power is properly being supplied to the PCMCIA card and/or whether the PCMCIA card is busy transmitting or receiving information.

Unfortunately, there are a number of drawbacks associated with the provision of an LED display on the detachable PCMCIA antenna. Such problems stem from the difficulty in providing power to the LEDs. One known solution has been to have a separate power source in the detachable antenna for powering the LEDs. According to another known solution, the PCMCIA card includes a special power connector between the detachable antenna and the main portion of the PCMCIA card for providing power to the LEDs. However, both of these solutions add extra cost, hardware and complexity to the PCMCIA card. The special power connectors can be relatively expensive. Moreover, upon detaching the antenna there no longer is an LED display available indicative of the operation of the PCMCIA card unless a second LED display is also included on the main portion of the PCMCIA card. Thus, there is the necessity for redundant components.

In view of the aforementioned shortcomings associated with PCMCIA cards, there is a strong need in the art for a method and apparatus for providing a light display on a detachable antenna at relatively low cost without the need for a separate power source or special power connector. More generally, there is a strong need in the art for a method and apparatus for providing a light display on a detachable portion of any type peripheral device.

SUMMARY OF THE INVENTION

The present invention eliminates the need to supply power to a light display in a detachable portion of a peripheral device such as an antenna. Instead, the present invention uses a light transfer medium such as a light pipe or fiber optic cable to direct light from one or more light sources (e.g., LEDs) situated on a main portion of the peripheral device through the detachable portion. For example, the LEDs situated on the end of the main portion of a PCMCIA card are powered via the internal power supply of the PCMCIA card. Light is transferred from the LEDs through a detachable antenna using light pipes or fiber optic cables located within the detachable antenna. The light can then be displayed from an aperture in the detachable antenna. Thus, no extra power lines or supplies are needed. By using light pipes or fiber optic cables, the detachable antenna can provide highly desirable LED type displays without the need of power, thereby eliminating the problems mentioned above.

According to one particular aspect of the invention, a peripheral device for a computer is provided, including a first portion including electronic circuitry and a light source for emitting light; a second portion selectively detachable from the first portion, the second portion including a light transfer medium for directing light from one end of the light transfer medium to another end; and wherein the one end of the light transfer medium is optically aligned with the light source when the second portion is attached to the first portion, and the light transfer medium directs at least a fraction of the light emitted from the light source from the one end to the another end for display from the second portion.

According to another aspect of the invention, in a computer peripheral device including a first portion having electronic circuitry and a light source for emitting light; and a second portion selectively detachable from the first portion, a method for transferring light from the light source included in the first portion through the second portion including the steps of: optically aligning a transfer medium with the light source when the second portion is attached to the first portion; and directing at least a fraction of light emitted from the light source through a light transfer medium included in the second portion from one end of the light transfer medium to another end for display from the second portion.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3 is an exploded view of the PCMCIA card and detachable antenna (with the antenna element removed) in accordance with the present invention;

FIG. 6 is a cross sectional view of the detachable antenna (including the antenna element) taken along the line 6—6 as shown in FIG. 3 according to a first embodiment of the present invention; and.

DESCRIPTION OF THE PREFERRED EMBODIMENTS

Figure 1:
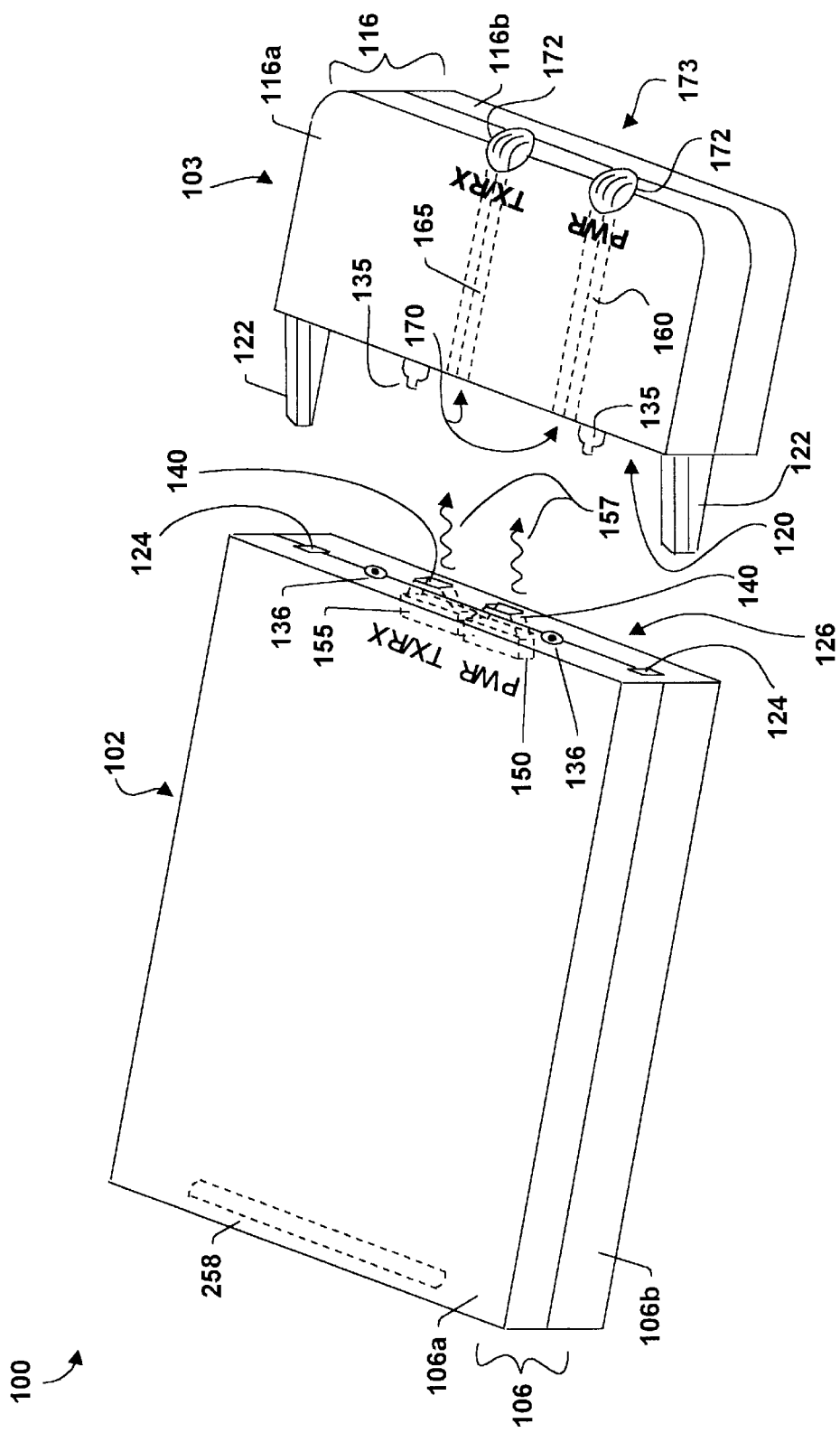
FIG. 1 is a perspective view of a PCMCIA card with a detachable antenna in accordance with the present invention.

The present invention will now be described with reference to the drawings, wherein like reference numerals are used to refer to like elements throughout.

Referring initially to FIG. 1, a wireless network adapter card is shown generally at 100. The wireless network adapter card 100 includes a PCMCIA card 102 and a detachable antenna 103. The PCMCIA card 102 includes a card-shaped housing 106 having a top cover 106a and a bottom cover 106b. Included within the housing 106 is an integrated circuit (IC) board 108 (see FIG. 3). The housing 106 is made of plastic or metal but includes an RF shielding metal to minimize RF leakage into and from the surrounding area. The top and bottom covers 106a and 106b are ultrasonically welded together and or secured together by small screws, adhesives or other fastening means as is conventional.

Figure 4:
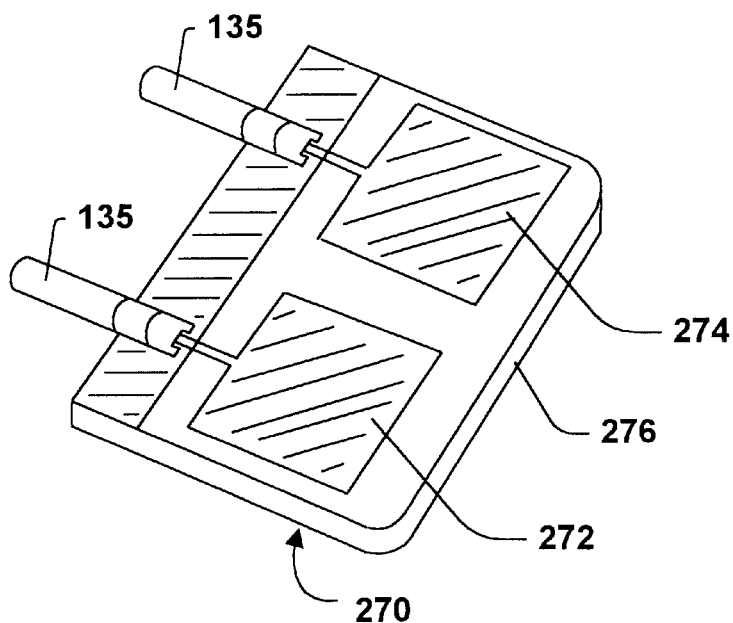
FIG. 4 is a perspective view of an antenna element included within the detachable antenna in accordance with the present invention.

The detachable antenna 103 includes a card-shaped housing 116 having a top cover 116a and a bottom cover 116b which form a radome for a pair of patch type diversity antennas housed therein (see FIG. 4). The housing 116 is made of a plastic radome material such as Lexan which allows radio frequency (RF) energy to pass therethrough with little or no attenuation while still providing structural support and rigidity. The top and bottom covers 116a, 116b may be ultrasonically welded together or otherwise joined according to conventional techniques.

The detachable antenna 103 is selectively detachable from the PCMCIA card 102 by way of a number of frictional connections. More particularly, an edge 120 of the detachable antenna 103 includes a pair of wedge shape tines 122. The tines 122 are designed to mate in forced frictional engagement with a corresponding pair of wedge shape channels 124 located on an edge 126 of the PCMCIA card 102. Furthermore, the detachable antenna 103 includes a pair of male plug-type RF connectors 135 which protrude from the edge 120 of the antenna housing 116. The connectors 135 provide respective RF connections between the antenna element within the detachable antenna 103 as discussed more fully below and the integrated circuit board 108 within the PCMCIA card 102. The connectors 135 are designed to mate with corresponding female-type connectors 136 located flush with the edge 126 of the PCMCIA card 102. The connectors 136 in turn are connected to a radio within the PCMCIA card 102.

The connectors 135 and 136 are preferably of a type which provides both electrical and mechanical connection between the detachable antenna 103 and the PCMCIA card 102 for a secure fit in combination with the tines 122. The connectors 135 and 136 preferably include a snap ring mechanism or the like which provides for a releasable locking action between the antenna 103 and the PCMCIA card 102 when the tines 122 are fully engaged within the channels 124 and the edges 120 and 126 are substantially flush. By firmly pulling the antenna 103 and the PCMCIA card 102 apart, the snap ring mechanism releases allowing the antenna 103 to be separated from the PCMCIA card 102.

The PCMCIA card 102 also includes a pair of apertures 140 on the edge 126. Exposed through each aperture 140 is an LED which is driven by the circuitry within the PCMCIA card 102. Specifically, a first LED 150 (shown in phantom) is used to indicate whether power is properly being supplied to the PCMCIA card 102, while a second LED 155 (also shown in phantom) is used to indicate when the radio within the PCMCIA card is either transmitting or receiving information. The LEDs 150, 155 are positioned within the housing 106 to emit light through the respective apertures 140 in the direction of arrows 157 as shown in FIG. 1. In the exemplary embodiment, the LEDs 150, 155 illuminate light having colors of green and amber, respectively, although other colors could readily be used.

In order to provide a similar light display from the detachable antenna 103, the detachable antenna 103 according to the present invention includes a light transfer medium within the housing 116 such as light pipes 160 and 165 (shown in phantom). The light transfer medium is utilized to transfer the light emitted from the LEDs 150, 155 through the detachable antenna 103 where it is subsequently emitted as a light display from the housing 116. In this manner, it is not necessary to provide a separate power source in the antenna 103. Nor is it necessary to provide a special electrical connection between a power supply in the PCMCIA card 102 and the detachable antenna 103.

As is discussed more fully below, each light pipe 160, 165 is positioned within the housing 116 such that one end of the light pipe is exposed through an aperture 170 in the edge 120 of the housing 116 in optical alignment with the light emitted from the corresponding LED 150, 155. The other end of each light pipe is exposed through another aperture 172 in the housing 116 preferably at an edge 173 opposite the edge 120. As a result, the light from the LEDs 150, 155 is received by and directed through the respective light pipes 160, 165 so as to be emitted from the respective apertures 172. Consequently, the light from the LED 150 still can be used to produce a light display from the detachable antenna 103 indicative of power being properly supplied to the PCMCIA card 102. Similarly, light emitted from the LED 155 is emitted as a light display from the antenna 103 so as to indicate when the radio within the PCMCIA card 102 is transmitting and/or receiving.

Figure 2A:
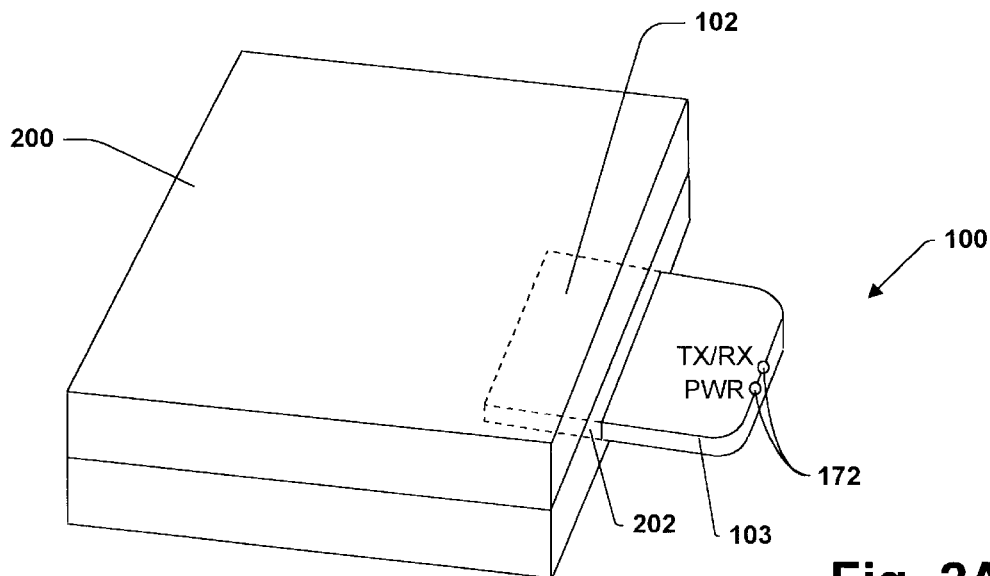
FIG. 2A is a perspective view of the PCMCIA card with the detachable antenna inserted in a notebook computer PCMCIA card slot in accordance with the present invention.
Figure 2B:
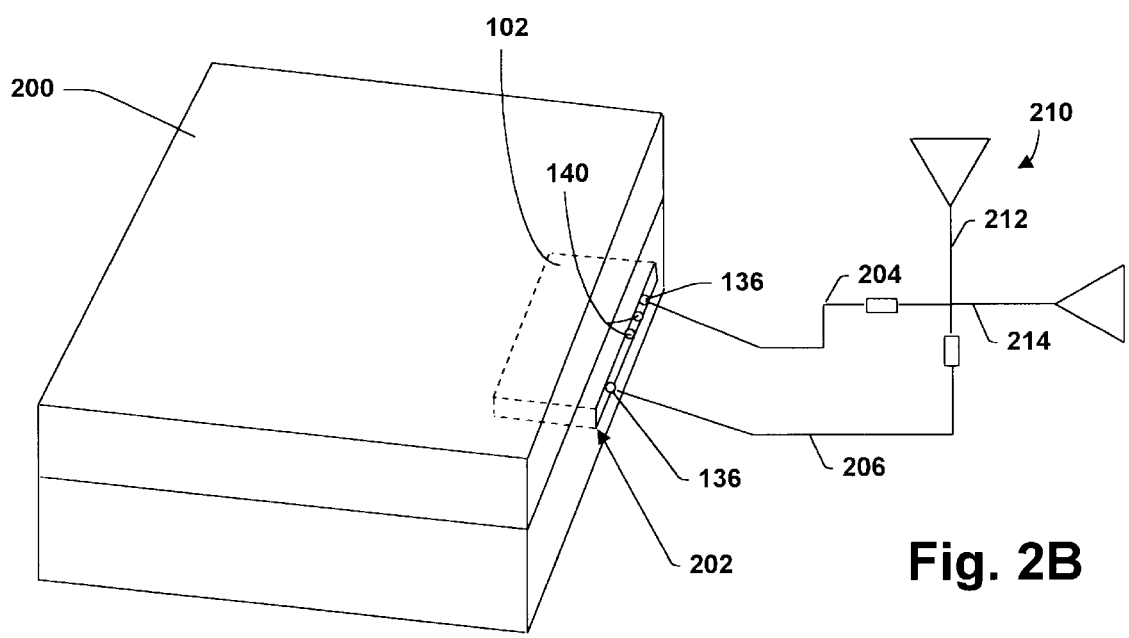
FIG. 2B is a perspective view of the PCMCIA card of FIG. 2A with the antenna detached and an external antenna connected thereto in accordance with the present invention.

Referring briefly now to FIGS. 2A and 2B, the network adapter card 100 is shown, for example, as used in a notebook type personal computer 200. FIG. 2A illustrates the use of the card 100 with the antenna 103 attached to the PCMCIA card 102. The PCMCIA card 102 is inserted into a PCMCIA card slot 202 as is conventional. The antenna 103 extends outwardly from the computer 200 in order to transmit and receive radio communications based on operations controlled by the computer 200. It is noted that the aforementioned apertures 172 are readily visible. Light emitted from the LEDs 150, 155 is transmitted through the apertures 172 so as to indicate to a user the operational state of the card 100.

In the event a user wishes to connect the PCMCIA card 102 to an auxiliary antenna, the antenna 103 is detached from the PCMCIA card 102 in the manner noted above. Thus, the connectors 136 on the edge 126 are exposed when the PCMCIA card 102 is inserted in the slot 202 as shown in FIG. 2B. Corresponding connectors on the ends of cables 204, 206 are utilized to connect an auxiliary antenna 210 to the radio within the PCMCIA card 102. The antenna 210 is made up of two separate elements 212 and 214 which are oriented orthogonally as is known. Furthermore, it is noted that the apertures 140 on the edge 126 of the PCMCIA card 102 are exposed through the slot 202 so that a user still may receive an indication as to the status of the card 100 based on the direct output from the LEDs 150, 155.

Referring now to FIG. 3, an exploded view of the network adapter card 100 is shown. As can be seen, the PCMCIA card 102 has housed therein an IC board 108 which includes a top side 215 and a bottom side 217. The top 215 and bottom 217 sides of the IC board 108 contain electronic circuitry which enables the PCMCIA card 102 to communicate wirelessly via the detachable antenna 103. Generally speaking, the IC board 108 includes an electronic control section 220 which controls both an RF section 222 and an LED driver 224. The electronic control section 220 is also connected to an input/output (I/O) port 226 which is coupled to a multi-terminal connector 228. The connector 228 enables the card 100 to be connected to a corresponding connector in the PCMCIA card slot 202 (FIGS. 2A–2B) as is conventional. Each of the connectors 136 is connected to the RF section 222 in order that radio signals to and from the RF section are transmitted/received by whichever type antenna is connected to the connectors 136. The LED driver 224 has respective outputs coupled to the LEDs 150, 155 and drives the LEDs in accordance with control signals provided by the electronic control section 220.

The LEDs 150, 155 are both mounted to the bottom side 217 of the IC board 108 using conventional soldering methods, for example. Exemplary LEDs suitable for use as the LEDs 150, 155 are right angle surface mount LEDs commercially available as part number BR1101F from Stanley Electric Co., LTD of Irvine, Calif. It will be appreciated, however, that various other types of LEDs or other light sources could be employed in different embodiments.

In FIG. 3, the antenna element is not shown in order to provide a better view of the light pipes 160, 165. The light pipes 160, 165 are positioned in the bottom cover 116b of the detachable antenna housing 116. Each light pipe 160, 165 is held in position in pressed fit engagement within an appropriately sized groove 230 molded into the bottom cover 116b. Also molded into the bottom cover 116b is a set of standoffs 234 on top of which the antenna element (not shown in FIG. 3) rests. Upon welding the top cover 116a and bottom cover 116b together, the light pipes 160, 165 and the antenna element (FIG. 4) are sandwiched together so as to become effectively immobilized relative to each other.

As is shown in FIG. 3, the aperture 172 is made up of a notch 172a in the wall 235a of the top cover 166a and a notch 172b in the wall 235b of the bottom cover 116b. Each tine 122 is made up of a half wedge shape tine 122a and 122b extending from the top and bottom covers 116a and 116b, respectively. The corresponding wedge shape channels 124 are made up of half wedge shape channels 124a and 124b in the walls 236a and 236b of the top and bottom covers 116a and 116b, respectively. The top cover 116a of the detachable antenna housing 116 includes semicircular recesses (not shown) which combined with the semicircular recesses 250 in the bottom cover 116b form apertures through which the connectors 135 (FIG. 1) extend. Similarly, the top cover 106a of the PCMCIA card 102 includes semicircular recesses 252a which combined with the semicircular recesses 252b in the bottom cover 106b form apertures through which the connectors 136 are exposed. The top cover 106a also includes a slot forming recess (not shown) which combined with the slot forming recess 256 in the bottom cover 106b forms a slot 258 (shown in phantom in FIG. 1) which allows the card 100 to be connected to a computer via a PCMCIA card slot.

Figure 6:
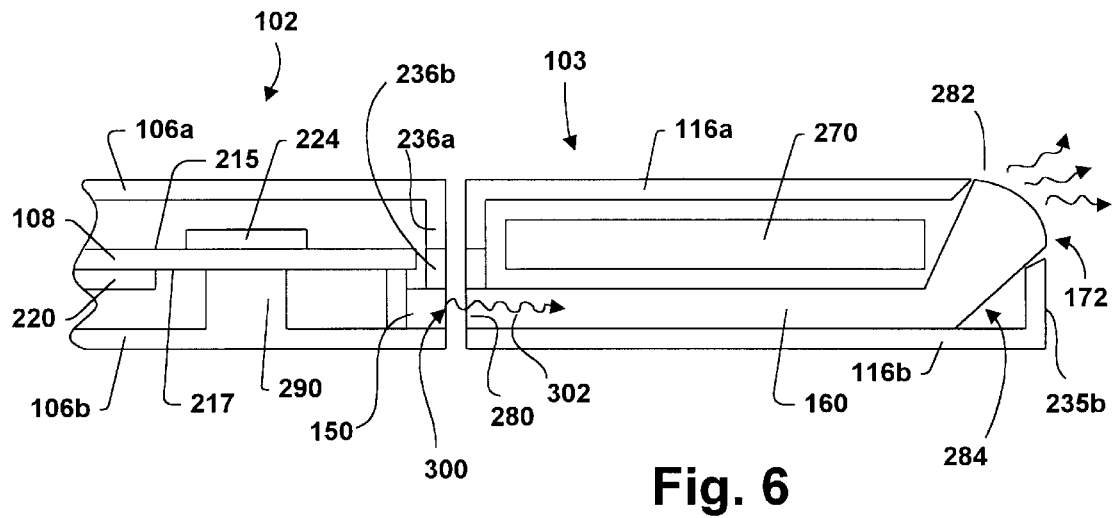

FIG. 4 illustrates an exemplary antenna element 270 which fits within the housing 116 of the detachable antenna 103. The antenna element 270 in this embodiment includes separate patch antenna elements 272 and 274 formed on a substrate 276. The substrate 276 is sized to fit within the housing 116 and rest upon the standoffs 234 above the light pipes 160, 165 as illustrated in FIG. 6 discussed below. Each patch antenna element 272, 274 is connected to a corresponding one of the connectors 135. As shown, the connectors 135 are each mounted securely to the substrate 276. In an alternative embodiment, the antenna element 270 could include monopole, dipole, or other antennas, as will be appreciated.

Figure 5:
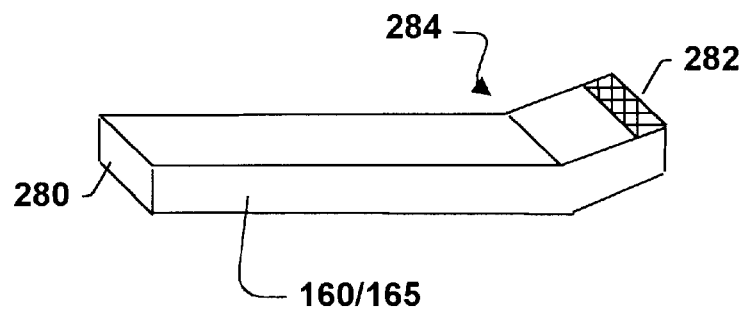
FIG. 5 is a perspective view of a light pipe included within the detachable antenna in accordance with the present invention.

FIG. 5 is an isolated view of the light pipe 160, 165 in the exemplary embodiment. The light pipe 160, 165 has a rectangular cross section having a width which coincides with the width of the groove 230 (FIG.3) in which the light pipe is retained. The light pipe 160, 165 has one end 280 which is exposed through the aperture 170 in the bottom cover 116b of the detachable antenna 103. The other end 282 of the light pipe is exposed through the aperture 172 in the housing 116 and, as is shown in FIG. 6, is rounded to follow the general contour of the housing. The light pipe 160, 165 includes a dog leg section 284 towards the end 282 which directs the light upward towards the top of the housing 116 as is illustrated in FIG. 6. The end 282 includes a roughened surface which acts to diffuse the light which is displayed through the aperture 172. The end 280 preferably has a smooth surface which facilitates the coupling of light from the LEDs 150, 155 into the light pipe 160, 165. The light pipes 160, 165 can be made of any suitable material such as clear acrylic or clear polycarbonate.

FIG. 6 is a cross section of a portion of the card 100 taken along line 6—6 in FIG. 3. As shown in the exemplary embodiment, the LED 150 is mounted on the bottom surface of the IC board 108 which is supported by standoffs 290 formed on the bottom cover 106b. The LED 150 has an illuminating face 300 which is substantially flush and in optical alignment with the end 280 of the light pipe 160. By maintaining the LED illuminating face 300 substantially flush with end 280, the light pipe 160 receives light 302 illuminated from the LED 150 with minimal coupling loss when the detachable antenna 103 is connected to the PCMCIA card 102. Although there is no requirement that the end 280 of the light pipe 160 butt directly up against the illuminating face 300, the closer together the two are the better the transfer of light as will be appreciated.

Due to the properties of the light pipe 160, the light 302 which is coupled into the light pipe 160 from the LED 150 is directed within the light pipe 160 through the detachable antenna 103 prior to being emitted from the end 282 at the aperture 172. Although not shown in the Figures, the arrangement of the LED 155 and the light pipe 165 is virtually identical to that shown in FIG. 6.

Figure 7:
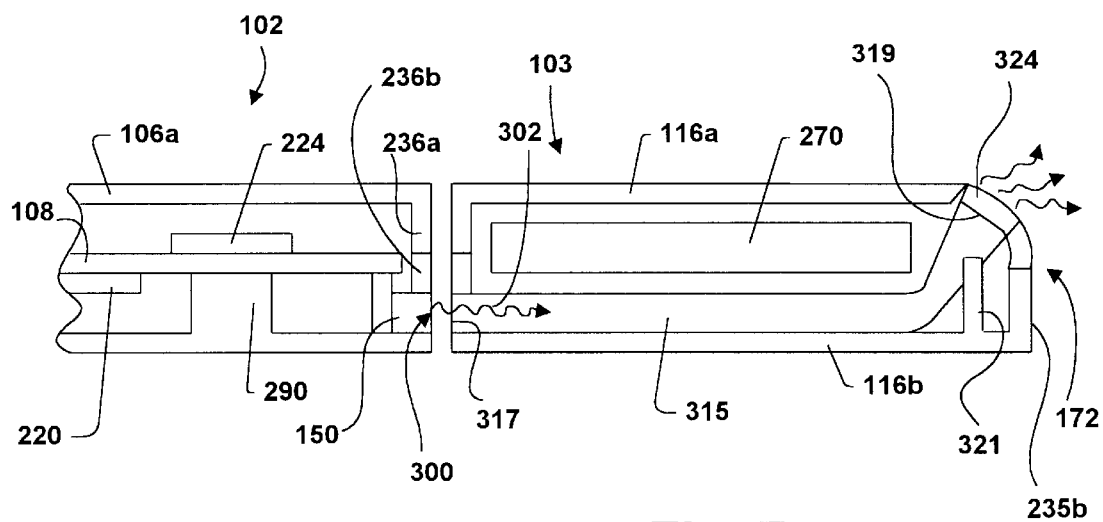
FIG. 7 is a cross sectional view of the detachable antenna according to a second embodiment of the present invention.

In the preferred embodiment the detachable antenna 103 uses light pipes 160, 165 to transfer light from LEDs 150, 155. However, it is equally within the scope of the invention to utilize another form of light transfer medium for directing the light from the LEDs 150, 155 through the detachable antenna 103 to the apertures 172 for display. For example, a fiber optic cable 315 can be substituted in place of the light pipes 160, 165 as shown in FIG. 7. One end 317 of the cable 315 is flush with the illuminating face 300 so as to receive light 302 transmitted from the LED 150, for example. The light 302 is then directed through the fiber optic cable 315 towards the other end 319 of the fiber optic cable 315 at the aperture 172. Due to the relative flexibility of the fiber optic cable 315, the bottom cover 116b includes a support 321 for holding the end 319 in position at the aperture 172. Furthermore, the aperture in this embodiment includes a protective lens 324 at the aperture 172 which serves to protect the fiber optic cable 315 from damage and also serves to diffuse the light 302 as it is emitted from the end 319.

Accordingly, the present invention eliminates the need to provide power to the detachable antenna 103 for a light display, thereby reducing complexity and costs associated with the device.

Although the invention has been shown and described with respect to certain preferred embodiments, it is obvious that equivalents and modifications will occur to others skilled in the art upon the reading and understanding of the specification. For example, the invention has been described above primarily in the context of a PCMCIA type peripheral device with a detachable antenna. However, it will be appreciated that the present invention can be used with other types of peripheral devices having a detachable portion. Further, the number of LEDs or other type light sources used and the function of each LED could also vary from device to device. Similarly, light sources other than LEDs are also well within the scope of the invention. The present invention includes all such equivalents and modifications, and is limited only by the scope of the following claims.

What is claimed is:

1. A peripheral device for a computer, comprising:
   a first portion and a second portion, the first portion including electronic circuitry and a light source for emitting light such that the first portion is operational in a first mode independent of the second portion, the light source providing a first display to a user indicative of an operational status of the peripheral device in the first mode;
   the second portion being selectively detachable from the first portion, the second portion including a light transfer medium for directing light from one end of the light transfer medium to another end; and
   wherein when the second portion is attached to the first portion the first portion is operational in a second mode in conjunction with the second portion, and wherein in the second mode the one end of the light transfer medium is optically aligned with the light source, and the light transfer medium directs at least a fraction of the light emitted from the light source from the one end to the another end for display from the second portion to provide a second display to the user indicative of an operational status of the peripheral device in the second mode.

2. The peripheral device of claim 1, wherein the light transfer medium comprises a light pipe.

3. The peripheral device of claim 1, wherein the light transfer medium comprises a fiber optic cable.

4. The peripheral device of claim 1, wherein the first portion comprises a first housing having radio circuitry housed therein and the second portion comprises a second housing having an antenna stored therein, the antenna being selectively detachable from the radio circuitry.

5. The peripheral device of claim 4, wherein the at least a fraction of the light is displayed from the second portion when the radio circuitry is at least one of transmitting and receiving information.

6. The peripheral device of claim 4, wherein the at least a fraction of the light is displayed from the second portion when the radio circuitry is supplied with power.

7. The peripheral device of claim 6, wherein the peripheral device is a PCMCIA device.

8. The peripheral device of claim 1, wherein the one end of the light transfer medium substantially abuts the light source when the second portion is attached to the first portion.

9. The peripheral device of claim 8, wherein the light source comprises a light emitting diode.

10. The peripheral device of claim 1, wherein the first portion comprises a plurality of light sources and the second portion comprises a plurality of corresponding light transfer mediums.

11. A peripheral device for a computer, comprising:
   a card-like first portion and a card-like second portion, the card-like first portion having electronic circuitry and a connector operatively coupled to the electronic circuitry for connecting the first portion to the computer, and including a light source for emitting light such that the first portion is operational in a first mode independent of the second portion, the light source providing a first display to a user indicative of an operational status of the peripheral device in the first mode;
   the card-like second portion including a light transfer medium for directing light from one end of the light transfer medium to another end, an edge of the second portion being selectively detachable from an edge of the first portion; and
   wherein when the second portion is attached to the first portion the first portion is operational in a second mode in conjunction with the second portion, and wherein in the second mode the one end of the light transfer medium is optically aligned with the light source, and the light transfer medium directs at least a fraction of the light emitted from the light source from the one end to the another end for display from the second portion to provide a second display to the user indicative of an operational status of the peripheral device in the second mode.

12. The peripheral device of claim 11, wherein the light source and the end of the light transfer medium are located at the edge of the first portion and the second portion, respectively, and abut each other when the second portion is attached to the first portion.

13. The peripheral device of claim 12, wherein the other end of the light transfer medium is located toward another edge of the second portion which is opposite the edge at which the one end is located.

14. The peripheral device of claim 13, wherein the connector is located toward another edge of the first portion which is opposite the edge at which the light source is located.

15. The peripheral device of claim 11, wherein the light transfer medium comprises a light pipe.

16. The peripheral device of claim 11, wherein the light transfer medium comprises a fiber optic cable.

17. The peripheral device of claim 11, wherein the first portion comprises a first housing having radio circuitry housed therein and the second portion comprises a second housing having an antenna stored therein, the antenna being selectively detachable from the radio circuitry.

18. The peripheral device of claim 17, wherein the at least a fraction of the light is displayed from the second portion when the radio circuitry is at least one of transmitting and receiving information.

19. The peripheral device of claim 11, wherein the peripheral device is a PCMCIA device.

20. The peripheral device of claim 11, wherein the light source comprises a light emitting diode.

* * * * *